July 2, 1957 F. E. OBERMAIER 2,797,875
THERMAL SENSING CAR HEATER VALVE
Filed April 11, 1955 2 Sheets-Sheet 2

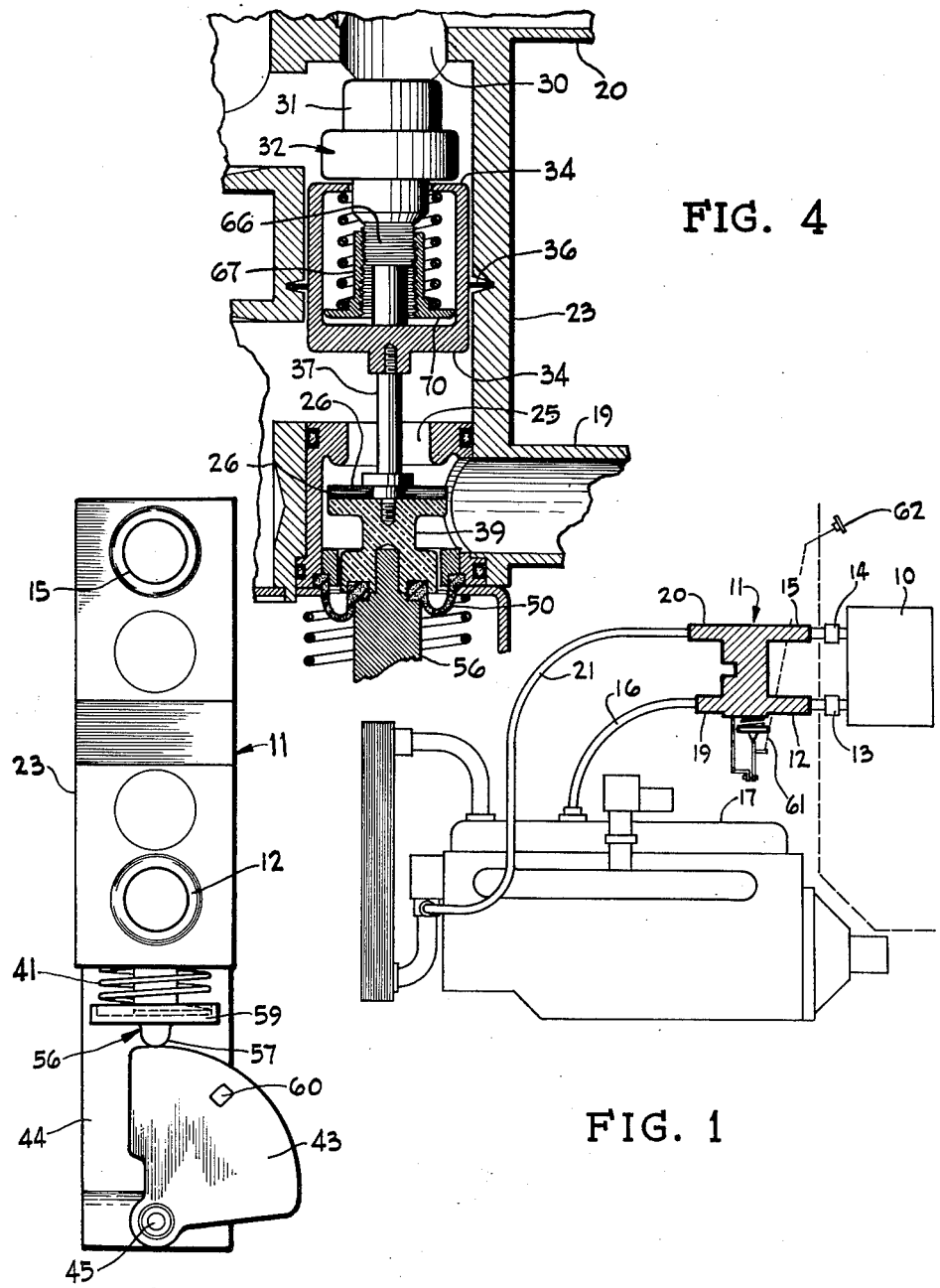

INVENTOR
FRANK E. OBERMAIER
BY
ATTORNEYS

United States Patent Office 2,797,875
Patented July 2, 1957

2,797,875

THERMAL SENSING CAR HEATER VALVE

Frank E. Obermaier, Oak Park, Ill., assignor to The Dole Valve Company, Chicago, Ill., a corporation of Illinois Application April 11, 1955, Serial No. 500,552

13 Claims. (Cl. 237—8)

This invention relates to improvements in heater systems and thermal sensing valves therefor.

A principal object of my invention is to improve upon hot water heater systems for the passenger compartments of automotive vehicles by controlling the temperature of the passenger compartment by sensing the temperature of the hot water as it is discharged from the heater.

A further object of my invention is to provide a more efficient heater control system than formerly by providing manual selection of the temperature within the passenger compartment of the vehicle and by maintaining the temperature uniform at the selected temperature by sensing the temperature of the hot water as it is discharged from the vehicle heater and controlling the rate of flow of the hot water leaving the heater in accordance with the temperature thereof.

A further object of my invention is to provide a novel and improved form of heater valve so arranged as to control the output temperature of the heater by thermally sensing the temperature of the water, as it leaves the heater.

Still another object of my invention is to provide a simple and improved form of heater valve that can be manually opened and closed and set to a selected temperature, and having a thermal element controlling the temperature of the water discharged from the heater and the flow from the heater in accordance with the temperature thereof.

A still further object of my invention is to provide a simple and improved form of heater valve controlling the flow of water from a hot water heater to the pump of an internal combustion engine of an automotive vehicle, in which a thermal element acts as a valve for varying the flow of water discharged from the heater in accordance with the temperature thereof.

Still another object of my invention is to provide a heater valve having a manually operable valve controlled from the dashboard of an automotive vehicle, for governing the supply of hot water to the heater in accordance with the desired temperature requirements, and having connected thereto and movable relative thereto a power type of thermal element forming a thermal sensing valve controlling the discharge of hot water from the heater in accordance with the temperature thereof.

Still another object of my invention is to provide a combined thermally operable and manually operable valve in which the manually operable valve controls the supply of hot water to a heater for an automotive vehicle, and the thermally operable valve is connected therewith and set thereby upon setting of the manually operable valve, but is operable independently thereof, to control the discharge of hot water from the heater in accordance with temperature conditions.

These and other objects of my invention will appear from time to time as the following specification proceeds and with reference to the accompanying drawings wherein:

Figure 1 is a diagrammatic view showing a heater valve constructed in accordance with my invention controlling the supply of hot water from the cooling system of an internal combustion engine to a hot water heater for the passenger compartment of an automotive vehicle;

Figure 2 is an end view of the valve diagrammatically shown in Figure 1;

Figure 4 is a fragmentary sectional view like Figure 3, but showing the supply valve for hot water to the heater in an open position and showing the thermal element in a selected temperature setting.

Figure 3:
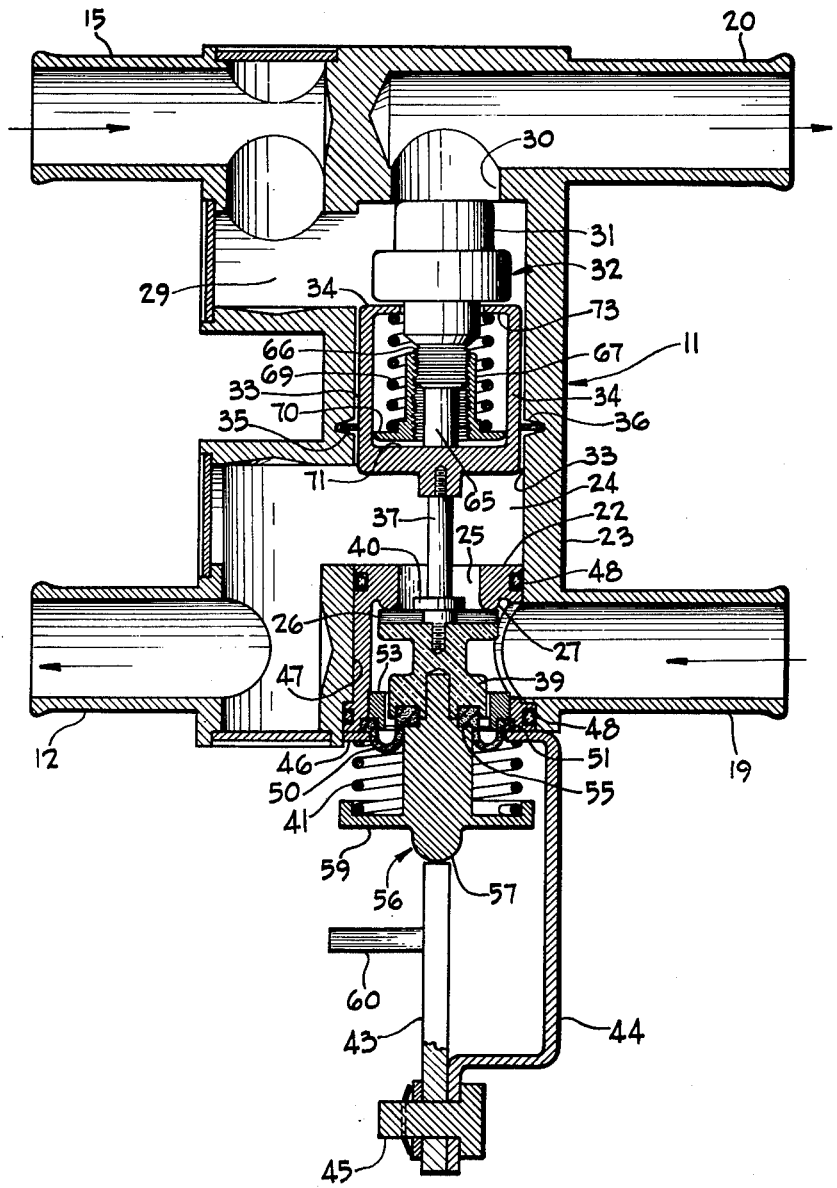
Figure 3 is an enlarged vertical sectional view taken through the valve shown in Figure 2, with the inlet valve for hot water to the heater shown in its closed position.

In the embodiment of my invention illustrated in the drawings, in Figure 1 a hot water heater 10 is shown as being located in the passenger compartment of an automotive vehicle. The heater 10, however, may be in the engine compartment or in any other desired location. A valve 11 controlling the supply of hot water to and the discharge of hot water from the heater 10 is shown as being in the engine compartment of the automotive vehicle. The valve 11 has an outlet 12 connected with a pipe 13 connected with the inlet end of the heater for supplying hot water thereto. Hot water is returned from the heater 10 through a pipe 14 connected with an inlet 15 for the valve 11. As shown in Figure 1, a flexible conduit 16 is connected from a cylinder head 17 of an internal combustion engine to a hot water inlet 19 for the valve 11 and directly associated with the outlet 12. The valve 11 also has an outlet 20 associated with the inlet 15 and connected on the suction side of the circulating pump (not shown) for the engine cooling system through the usual flexible conduit 21.

The valve 11 includes a valve body 23 having a chamber 24 therein in association with the hot water outlet 12 and connected with the inlet 19 through a removable seating member 22 having a port 25 leading therefrom. A valve 26 is shown as seating against a seat 27 encircling said port for controlling the supply of hot water to the heater 10.

The valve body 23 also has a valve chamber 29 therein spaced from the chamber 24 and in association with the inlet 15 and the outlet 20 through a port 30, shown as being in axial alignment with the port 25.

A casing 31 of a thermal element 32 is adapted to cooperate with the port 30 and form a throttling valve, controlling the flow of hot water through the port 30 from the inlet 15 in accordance with the temperature of hot water leaving the heater 10. The chambers 24 and 29 are connected together by a passageway 33 in axial alignment with the ports 30 and 25, and having a cage 34 for the thermal element 32 slidably guided therein and sealed thereto, as by a sealing ring 35, carried in a V-shaped recess 36 in the wall of the passageway 33 and engaging the wall of the cage 34. The sealing ring 35 thus seals the chambers 24 and 29 from each other and accommodates movement of the cage 34 along the passageway 33.

The cage 34 is moved along the passageway 33 in accordance with movement of the valve 26 as said valve moves to its open and closed positions and is connected with the valve 26 as by a rod 37 threaded within the cage 34 at one end and within a body 39 for the valve 26 at its opposite end. The rod 37 also has a collar 40 abutting the outside of the valve 26 and retaining said valve to the body 39. The valve 26 is herein shown as being the form of a flexible disk which may be made from rubber, neoprene or any like flexible material. Water enters the valve from the inlet 19 at the side of the valve. The pressure effect on the valve when in its open and closed position is thus minimized and the valve, in effect, is a single seated water valve.

The valve 26 is biased toward an open position by a compression spring 41 and opening thereof is controlled by a cam 43, pivoted to a depending bracket 44 on a pivot pin 45. The bracket 44 is herein shown as being formed integrally with an end plate and retainer 46 for the seating member 22. The seating member 22 is sealed to a wall 47 of the valve body as by O-rings 48, recessed within said seating member and engaging the wall 47.

A flexible diaphragm 50 is provided to seal the open end of the seating member 22. As herein shown, the diaphragm 50 has an outer annular flange 51 recessed within the outer end of the seating member 22 and retained thereto as by the end plate 46. The diaphragm 50 also has an inner annular flange 55, recessed within the end of the body 39 and retained thereto as by a flanged stem 56. The stem 56 is press fitted or otherwise secured to the body 39 and is shown in Figure 3 as projecting downwardly therefrom and as having a rounded lower end portion 57, engaging the face of the cam 43. The stem 56 also has a recessed flange 59 extending from its lower end portion and forming a seat for the spring 41.

The cam 43 is shown as having a pin 60 projecting outwardly therefrom, to which may be connected a Bowden wire 61 leading to the passenger compartment of the automotive vehicle, for connection with a knob 62 operable to pivot the cam 43 and accommodate the spring 41 to open the valve 26 to the extent necessary to provide the desired temperature within the passenger compartment of the autuomotive vehicle. It should here be noted that the face of the cam 43 is of a generally arcuate form, the center of which is offset from the center of the pivot pin 45, to accommodate progressive opening of the valve 26 by the spring 41 as the cam 43 is pivoted in a counter-clockwise direction from the position shown in Figures 2 and 3.

The thermal element 32 is herein shown as being of a so-called wax or power-type of thermal element, such as is shown and described in the Vernet Patent No. 2,368,181, dated January 30, 1945, and commonly called a "Vernay" thermal element. This thermal element has been selected for its extreme simplicity and efficiency, and its resultant low cost. It further has been selected for its relatively long travel and great power of operation in comparison with other types of thermostatic elements.

In the thermal element shown, a fusible thermally responsive material (not shown), which may be a wax alone, or a wax, a metal powder and a binder is carried in the casing 31 and acts against a membrane or deformable member (not shown), to extend a power member or piston 65 from a cylinder 66 of the thermal element when the temperature to which the casing 31 is subjected reaches the fusion temperature of the fusible thermally responsive material contained in the casing 31.

As herein shown, the cylinder 66 is threaded within a retainer 67 for a spring 69. The retainer 67 has a flange 70 at its inner end adjacent an end wall 71 of the cage 34. The spring 69 is seated on the flange 70 at one end and in an annular end wall 73 of the cage 34 at its opposite end.

The cylinder 66 of the thermal element 32 extends through the open portion of the annular end wall 73 of the cage 34 and is movable therealong. The piston 65 of the thermal element abuts the wall 71 of the cage 34, and as the temperature of the water discharged from the heater 10 reaches the operating temperature of the thermal element 32, the piston 65 will be extended from the cylinder 66. This will effect movement of the cylinder 66 and casing 31 relative to the cage 34, moving the casing 31 toward the port 30, to throttle the flow of water through said port.

It should here be understood that the outside diameter of the casing 31 is less than the diameter of the port 30.

The casing 31 thus acts as a throttling valve only, and never blocks off the flow of fluid through the port 30.

It should further be noted that as the valve 26 is moved to its various open positions that the cage 34 moves therewith, and also moves the thermal element 32 with respect to the port 30. This varies the travel of the thermal element necessary to throttle the flow of hot water through the port 30 and thus raises or lowers the temperature at which the thermal element 32 acts to throttle the flow of water through the port 30. In other words, the farther the valve 26 is moved to its open position, the higher will be the temperature required to operate the thermal element 32 to throttle the flow of hot water discharged from the heater through the port 30.

It may be seen from the foregoing that a simple and improved form of temperature control system for an automobile hot water heater has been provided, in which the desired temperature may be selected manually and the heater temperature is controlled by sensing the temperature of the water as it leaves the heater, or by the amount of water cooled by air passing therethrough, for heating the passenger compartment of the vehicle.

It may further be seen that a new and improved heater control valve has been provided in which the thermal element itself serves as a throttling valve and is moved away from its port increasing distances, as the temperature setting of the heater valve is increased and that the throttling valve is so arranged as to never block off the flow of hot water from the heater.

It will be understood that modifications and variations in the present invention may be effected without departing from the spirit and scope of the novel concepts thereof.

I claim as my invention:

1. In a heater control for controlling the internal temperature of the passenger compartment of an automotive vehicle having a hot water heater, a valve controlling the flow of hot water to the heater and manually positionable to vary the flow of hot water to the heater in accordance with the selected temperature of the passenger compartment of the automotive vehicle, and a thermally operable valve sensing the temperature of the hot water as it leaves the heater and throttling the water discharged from the heater upon predetermined temperature conditions determined by the selected temperature setting of the first valve.

2. In a heater control for controlling the internal temperature of the passenger compartment of an automotive vehicle having a hot water heater, a valve controlling the flow of hot water to the heater and positionable to vary the flow of hot water to the heater in accordance with a selected temperature for the passenger compartment of the automotive vehicle, and a second valve connected with said first valve and set in accordance with the position hereof and thermally responsive to the temperature of the hot water discharged from the heater to throttle the flow of hot water from the heater upon predetermined temperature conditions.

3. In a heater control for controlling the internal temperature of the passenger compartment of an automotive vehicle having a hot water heater, a valve controlling the flow of hot water to the heater and positionable to vary the flow of hot water to the heater in accordance with a selected temperature for the passenger compartment of the automotive vehicle, a second valve thermally responsive to the temperature of the hot water discharged from the heater and operable to throttle the flow of hot water from the heater upon predetermined temperature conditions, and a connection between said valves for varying the temperature at which said second valve will throttle the discharge of hot water from the heater in accordance with the temperature setting of said first valve.

4. In a heater control for controlling the internal temperature of the passenger compartment of an automotive vehicle having a hot water heater, a valve for controlling the flow of hot water to the heater, means for positioning said valve in accordance with the desired temperature of the passenger compartment of the automotive vehicle, a thermal element having a casing comprising a valve for controlling the flow of hot water from the heater in accordance with the temperature of the water discharged from the heater, and a connection between said first valve and said thermal element for varying the operating position thereof in accordance with the position and temperature setting of said first valve.

5. In a thermal sensing car heater valve, a valve body, an inlet into said body adapted to be connected with the outlet from a hot water heater of a car, an outlet from said valve body adapted to be connected with a cooling system circulation pump of an internal combustion engine, a port in said body between said inlet and said outlet, a thermal element carried in said body and having a casing containing a thermally expansible material, a cylinder extending from said casing and a piston extensible from said cylinder upon predetermined increases in temperature, a reaction member for said piston to effect movement of said casing into registry with said port to restrict the flow of fluid therethrough, and means operable to vary the position of said thermal element and casing with respect to said port and the temperature of operation of said thermal element to throttle the flow of fluid through said port.

6. In a thermal sensing car heater valve, a valve body having an inlet adapted to be connected with the discharge outlet from a hot water car heater, and an outlet adapted to be connected with the pump of the cooling system of an internal combustion engine, a chamber within said valve body, a port leading into said chamber and affording a communication between said inlet and said outlet, a thermal element carried in said valve body and having a casing containing a thermally expansible material and located in axial alignment with said port for movement within said port, to throttle the flow of hot water therethrough, said thermal element also having a cylinder extending from said casing and a piston extensible from said cylinder, a cage for said thermal element accommodating relative movement of said thermal element with respect to said cage and forming a reaction member for said piston, and a spring within said cage retaining said thermal element to said cage and biasing said thermal element and casing toward a retracted position with respect to said port and returning said piston with respect to said cylinder, whereby extension of said piston effected by predetermined increases in temperature of hot water flowing from said heater will effect movement of said casing against said spring toward said port, of throttle the flow of water therethrough.

7. In a thermal sensing car heater valve, a valve body having an inlet adapted to be connected with the discharge outlet from a hot water car heater and an outlet adapted to be connected with the pump of the cooling system of an internal combustion engine, a chamber within said valve body, a port leading into said chamber and affording a communication between said inlet and said outlet, a thermal element carried in said valve body and having a casing containing a thermally expansible material and located in axial alignment with said port for movement within said port, to throttle the flow of hot water therethrough, said thermal element also having a cylinder extending from said casing and a piston extensible from said cylinder, a cage for said thermal element accommodating relative movement of said thermal element with respect to said cage and forming a reaction member for said piston, a spring within said cage retaining said thermal element to said cage and biasing said thermal element and casing toward a retracted position with respect to said port and returning said piston with respect to said cylinder, whereby extension of said piston effected by predetermined increases in temperature of hot water flowing from said heater will effect movement of said casing against said spring toward said port, to throttle the flow of water therethrough, and means operable to vary the position of said cage with respect to said port and the operating temperature of said thermal element.

8. In a thermal sensing car heater valve, a valve body, an inlet into said valve body, an outlet leading from said valve body, a port within said valve body between said inlet and said outlet, a thermal element within said valve body having a casing containing a thermally expansible material, a cylinder extending from said casing and a piston extensible from said cylinder upon predetermined increases in temperature, a cage within said valve body carrying said thermal element and adjustably movable therealong toward and from said port, said cylinder and piston extending within said cage and said piston having engagement therewith and reacting thereagainst, a retainer on said cylinder and carried within said cage for movement therealong, a spring within said cage having engagement with said retainer and returning said piston within said cylinder and retractably moving said casing with respect to said port, said cage positioning said casing in axial alignment with said port to throttle the flow of hot water through said port upon predetermined temperatures thereof, and means for adjusting the position of said cage with respect to said port and the operating temperature of said thermal element, to throttle the flow of hot water through said port.

9. In a thermal sensing car heater valve, a vlave body, an inlet into said valve body, an outlet leading from said valve body, a port within said valve body between said inlet and said outlet, a thermal element within said valve body having a casing containing a thermally expansible material, a cylinder extending from said casing and a piston extensible from said cylinder upon predetermined increases in temperature, a cage within said valve body carrying said thermal element and adjustably movable therealong toward and from said port, said cylinder and piston extending within said cage and said piston having engagement therewith and reacting thereagainst, a retainer on said cylinder and carried within said cage for movement therealong, a spring within said cage having engagement with said retainer and returning said piston within said cylinder and retractably moving said casing with respect to said port, said cage positioning said casing in axial alignment with said port to throttle the flow of hot water through said port upon predetermined temperatures thereof, a second inlet into said valve body and an associated outlet therefrom, a manually adjustable valve for controlling the flow of hot water through said second outlet, a connection between said manually adjustable valve and cage, and means for adjusting the open position of said manually adjustable valve and the position of said casing with respect to said port to vary the temperature of throttling operation of said casing in accordance with the setting of said manually operable valve.

10. In a thermal sensing heater control valve, a valve body having two sets of associated inlets and outlets, means sealing one set of said inlets and outlets from the other, a valve manually operable to control the flow of hot water from one of said inlets to its associated outlet, and a thermal element within said valve body, sensing the temperature of hot water entering said other inlet and operative to throttle the flow of hot water from said other inlet to its associated outlet.

11. In a thermal sensing car heater control valve for controlling the temperature of the passenger compartment of an automotive vehicle by sensing the outlet temperature of the water from the heater, a valve body having two sets of associated inlet and outlet ports, means sealing one set of associated inlet and outlet ports from the other, a valve controlling the flow of hot water from one inlet port through its associated outlet port, means manually operable to open said valve, a thermal element for throttling the flow of hot water from the other inlet port to its associated outlet port, a retainer for said thermal element, and a connection between said retainer and said valve for varying the temperature at which said thermal element will throttle the flow of fluid in accordance with the position of said valve.

12. In a thermal sensing car heater control valve, a valve body, an inlet into said body, an outlet therefrom, a manually operable valve controlling the flow of hot water from said inlet to said outlet, means for adjusting the position of said manually operable valve and the flow rate of hot water through said outlet, a second inlet within said valve body and an associated outlet therefrom, a port within said valve body affording the flow of hot water from said second inlet to its associated outlet, a thermally operable valve for throttling the flow of hot water through said port comprising a thermal element having a casing movable with respect to said port, a cylinder extending from said casing and a piston extensible from said cylinder, a retainer for said thermal element and forming an abutment member for said piston, a spring retaining said thermal element to said retainer in axial alignment with said port and serving as a return spring for said piston, said casing being of a smaller outside diameter than the diameter of said port and throttling the flow of hot water through said port upon certain predetermined increases in temperature thereof.

13. In a thermal sensing car heater control valve, a valve body, an inlet into said body, an outlet therefrom, a manually operable valve controlling the flow of hot water from said inlet to said outlet, means for adjusting the position of said manually operable valve and the flow rate of hot water through said outlet, a second inlet within said valve body and an associated outlet therefrom, a port within said valve body affording the flow of hot water from said second inlet to its associated outlet, a thermally operable valve for throttling the flow of hot water through said port comprising a thermal element having a casing movable with respect to said port, a cylinder extending from said casing and a piston extensible from said cylinder, a retainer for said thermal element and forming an abutment member for said piston, a spring retaining said thermal element to said retainer in axial alignment with said port and serving as a return spring for said piston, said casing being of a smaller outside diameter than the diameter of said port and throttling the flow of hot water through said port upon certain predetermined increases in temperature thereof, and means connecting said manually operable valve with said retainer to vary the throttling temperature of hot water through said port in accordance with the position of adjustment of said manually operable valve.

References Cited in the file of this patent

UNITED STATES PATENTS

| | | |
|---|---|---|
| 1,434,542 | Horne | Nov. 7, 1922 |
| 2,277,814 | Booth | Mar. 31, 1942 |
| 2,356,958 | Von Wangenheim | Aug. 29, 1944 |
| 2,634,057 | Hoffmann | Apr. 7, 1953 |